United States Patent
Yoon et al.

(10) Patent No.: US 8,896,902 B2
(45) Date of Patent: Nov. 25, 2014

(54) MICROELECTROMECHANICAL SYSTEM SUBSTRATE AND DISPLAY APPARATUS HAVING THE SAME

(75) Inventors: Seon-Tae Yoon, Seoul (KR); Hyun Min Cho, Seoul (KR); Jae Byung Park, Seoul (KR); Yu-Kwan Kim, Incheon (KR); Donchan Cho, Seongnam-si (KR)

(73) Assignee: Samsung Display Co., Ltd., Yongin (KR)

(*) Notice: Subject to any disclaimer, the term of this patent is extended or adjusted under 35 U.S.C. 154(b) by 893 days.

(21) Appl. No.: 12/857,981

(22) Filed: Aug. 17, 2010

(65) Prior Publication Data
US 2011/0157676 A1     Jun. 30, 2011

(30) Foreign Application Priority Data

Dec. 30, 2009   (KR) .............................. 2009-134592

(51) Int. Cl.
G02B 26/00    (2006.01)
G02B 26/08    (2006.01)
G02F 1/29     (2006.01)

(52) U.S. Cl.
CPC ................................. *G02B 26/0841* (2013.01)
USPC ........................................ 359/290; 359/298

(58) Field of Classification Search
USPC ......... 359/290–292, 295, 298, 237, 242, 245, 359/246, 285–287
See application file for complete search history.

(56) References Cited

U.S. PATENT DOCUMENTS

| | | | | |
|---|---|---|---|---|
| 5,745,281 A * | 4/1998 | Yi et al. | ......................... | 359/290 |
| 6,535,663 B1 * | 3/2003 | Chertkow | ........................ | 385/18 |
| 7,321,456 B2 * | 1/2008 | Cummings | ..................... | 359/290 |
| 7,446,555 B2 * | 11/2008 | Choi et al. | ................ | 324/760.02 |
| 7,675,665 B2 * | 3/2010 | Hagood et al. | ................. | 359/233 |
| 2004/0125286 A1 * | 7/2004 | Moon et al. | .................... | 349/113 |
| 2005/0248827 A1 | 11/2005 | Starkweather et al. | | |
| 2008/0316562 A1 | 12/2008 | Sanders et al. | | |
| 2009/0034052 A1 | 2/2009 | Hagood et al. | | |

FOREIGN PATENT DOCUMENTS

JP     2007-212818    8/2007
WO    2006/091791    8/2006

* cited by examiner

*Primary Examiner* — William Choi
*Assistant Examiner* — Brandi Thomas
(74) *Attorney, Agent, or Firm* — H.C. Park & Associates, PLC

(57) ABSTRACT

A microelectromechanical system substrate includes a first substrate and an optical gate that is disposed on the first substrate and configured to move to at least two different positions. The optical gate comprises a color filter and a light absorbing section. A display apparatus includes a first substrate; a second substrate that faces the first substrate; an optical gate disposed on the first substrate, configured to move to at least two different positions, and comprising a color filter and a light absorbing section; and a light shielding layer that contacts the second substrate.

13 Claims, 14 Drawing Sheets

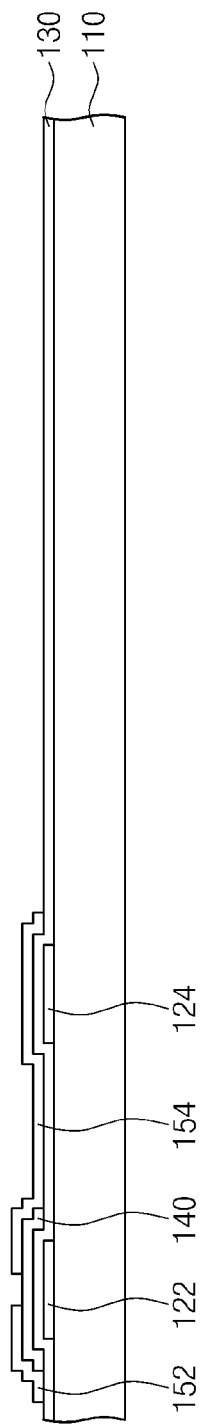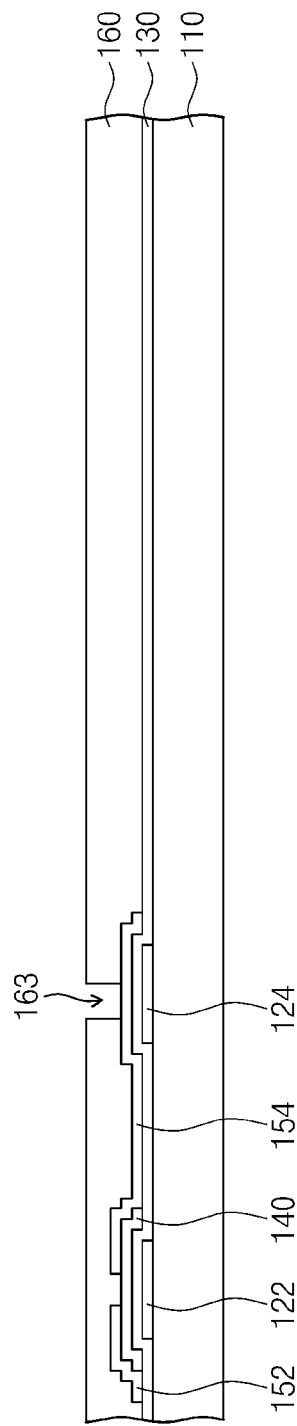

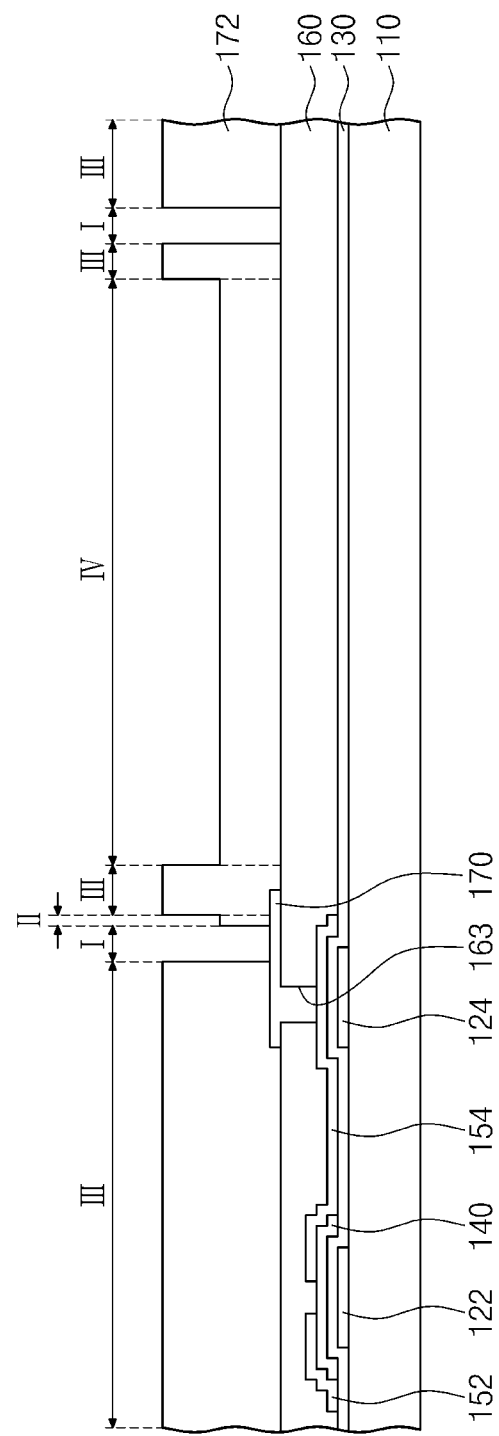

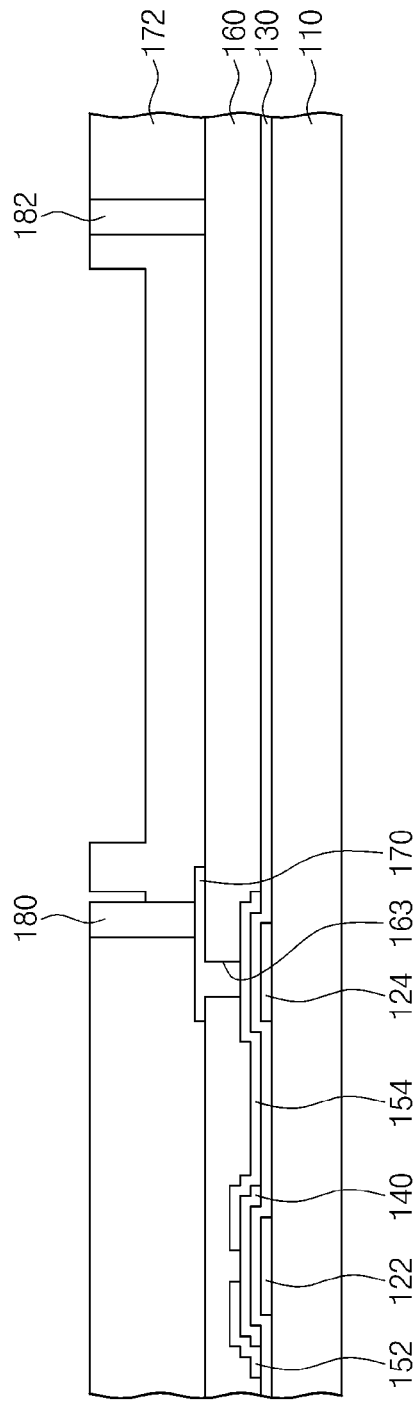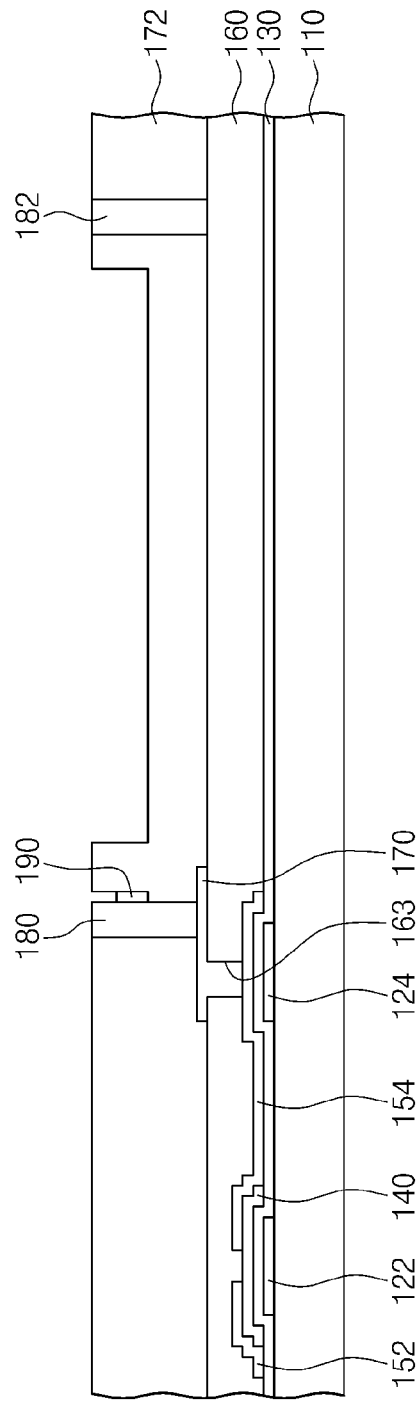

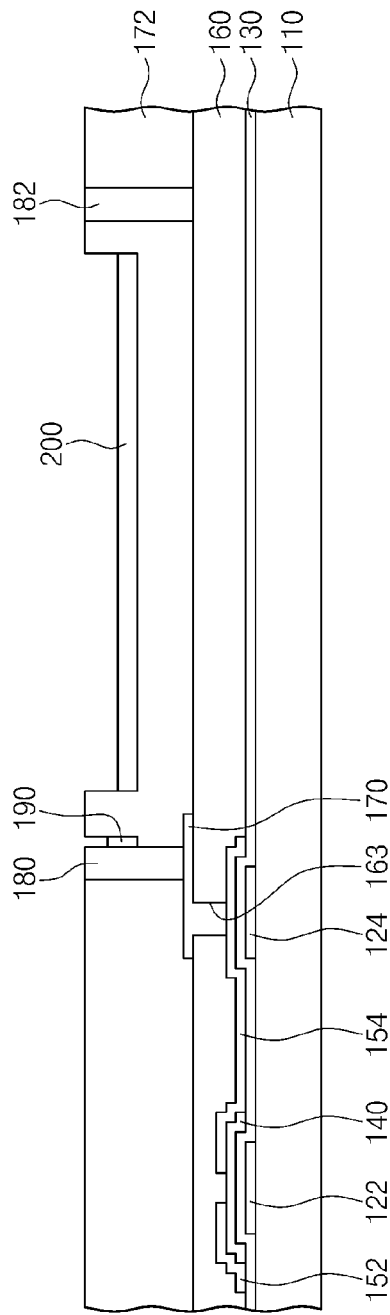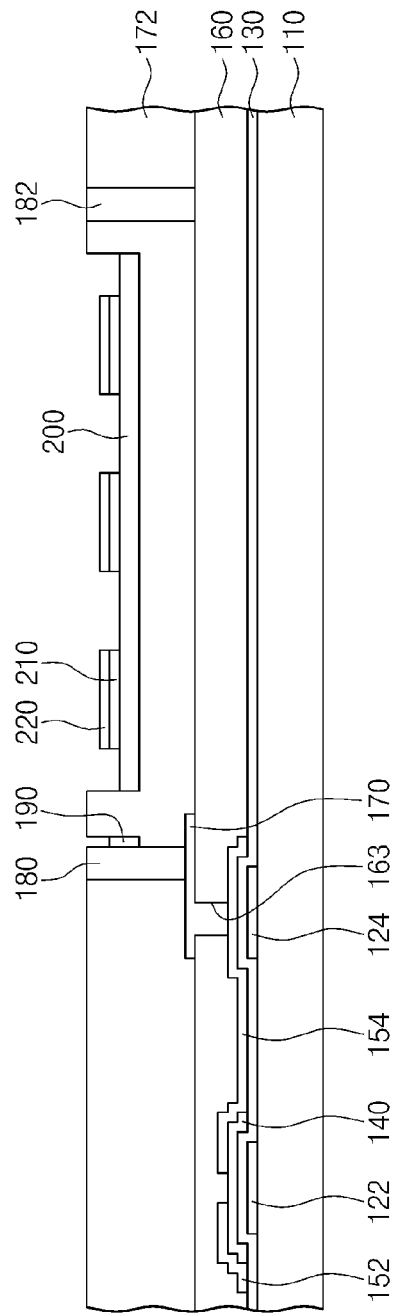

MICROELECTROMECHANICAL SYSTEM SUBSTRATE AND DISPLAY APPARATUS HAVING THE SAME

CROSS REFERENCE TO RELATED APPLICATION

This application claims priority from and the benefit of Korean Patent Application No. 2009-134592, filed on Dec. 30, 2009, which is hereby incorporated by reference for all purposes as if fully set forth herein.

BACKGROUND OF THE INVENTION

1. Field of the Invention

Exemplary embodiments of the present invention relate to a microelectromechanical system (MEMS) substrate and a display apparatus having the MEMS substrate.

2. Discussion of the Background

Recently, various display apparatuses such as a liquid crystal display (LCD), a plasma display panel (PDP), an organic light emitting display (OLED), a field effect display (FED), an electrophoretic display (EPD), and an MEMS display have become widely used. Among these displays, the MEMS display, which uses a micro-shutter, has a high-speed switching capacity and high illumination efficiency.

SUMMARY OF THE INVENTION

Exemplary embodiments of the present invention provide an MEMS substrate capable of using external light.

Additional features of the invention will be set forth in the description which follows, and in part will be apparent from the description, or may be learned by practice of the invention.

An exemplary embodiment of the present invention discloses a microelectromechanical system substrate that comprises a first substrate and an optical gate disposed on the first substrate and configured to move to at least two different positions. The optical gate comprises a color filter and a light absorbing section.

An exemplary embodiment of the present invention also discloses a display apparatus that comprises a first substrate, a second substrate facing the first substrate; an optical gate disposed on the first substrate, configured to move to at least two different positions, and comprising a color filter and a light absorbing section, and a light shielding layer contacting the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are cross-sectional views showing a manufacturing method of a first substrate of the display apparatus according to the first exemplary embodiment of the present invention.

DETAILED DESCRIPTION OF THE ILLUSTRATED EMBODIMENTS

Figure 1:
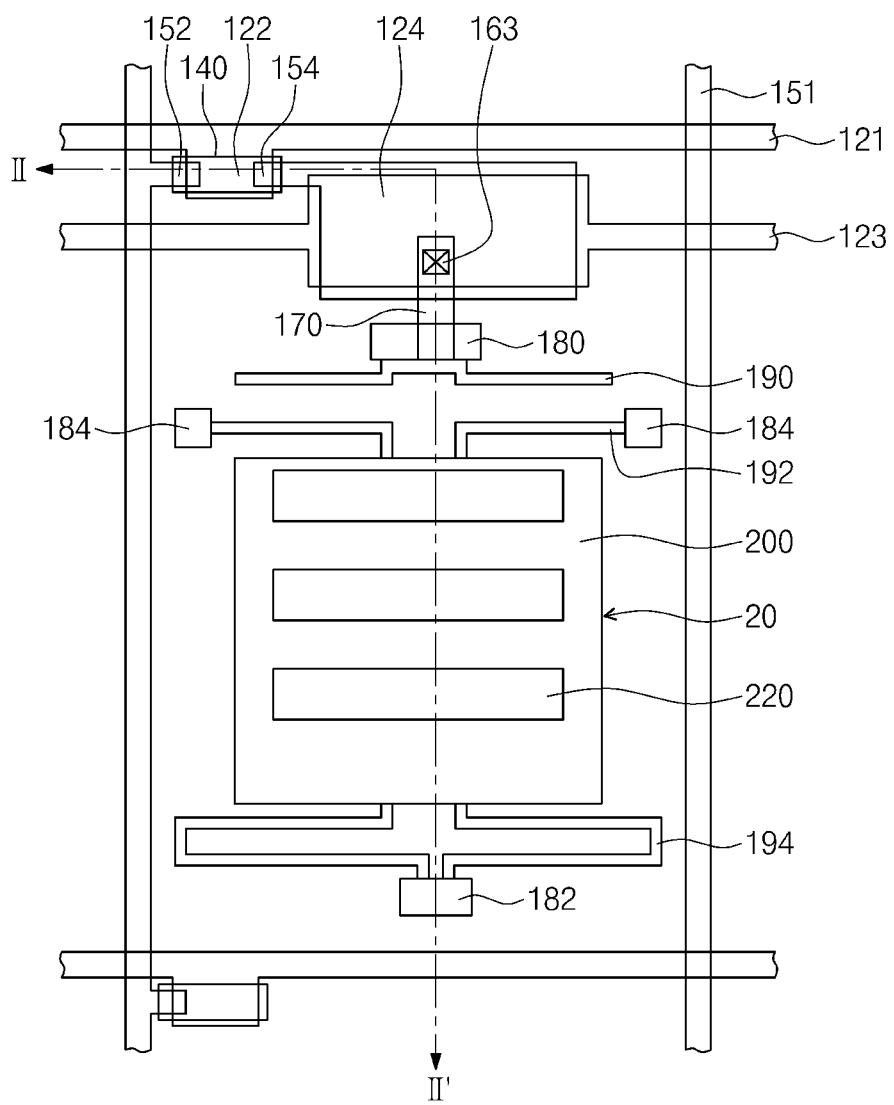
FIG. 1 is a plan view showing a display apparatus according to a first exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, a display apparatus including an MEMS substrate according to exemplary embodiments of the present invention will be described in detail with reference to accompanying drawings.

Figure 2:
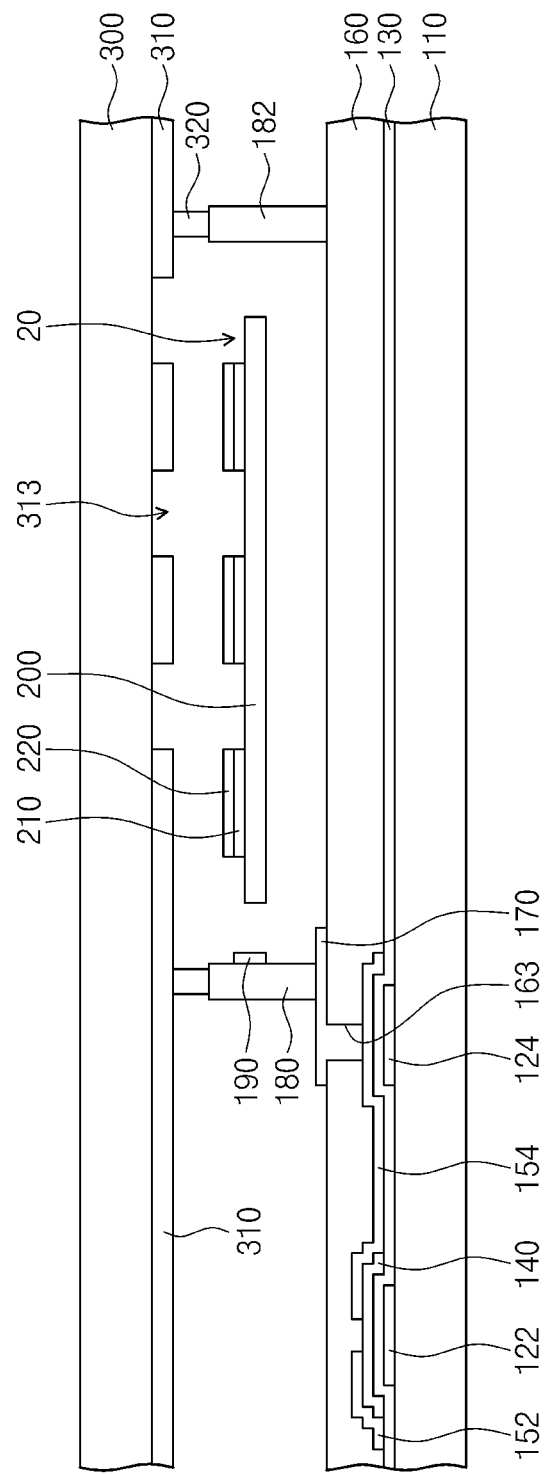
FIG. 2 is a cross-sectional view taken along line II-II' of FIG. 1.

FIG. 1 is a plan view showing the display apparatus according to a first exemplary embodiment of the present invention, and FIG. 2 is a cross-sectional view taken along line II-II' of FIG. 1.

As shown in FIG. 1 and FIG. 2, a gate line 121 extends in one direction on a first substrate 110, which may be made of a transparent material. A protruding portion of the gate line 121 serves as a gate electrode 122 of a thin film transistor. The gate line 121 has a wider width at one end thereof so that the end may be connected to an external circuit (not shown).

In addition, a storage electrode line 123 used to increase the storage capacitance of a pixel is provided in parallel to the gate line 121. The storage electrode line 123 may be made of the same material as that of the gate line 121 and may be provided on the same layer as that of the gate line 121. A portion of the storage electrode line 123 forms a storage electrode 124.

The gate line 121 and the storage electrode line 123 may have a first conductive layer with low resistivity that includes silver (Ag), an Ag-based metal such as an Ag alloy, aluminum (Al), and an Al-based metal such as an Al alloy. The gate line 121 and the storage electrode line 123 may have a multi-layer structure that includes a second conductive layer that may contain a metal (e.g., chromium (Cr), titanium (Ti), tantalum (Ta), molybdenum (Mo), or an alloy thereof such as an MoW alloy) with superior physical, chemical, and electrical contact characteristics with indium tin oxide (ITO) or indium zinc oxide (IZO) and with the first conductive layer. When the gate line 121 and the storage electrode line 123 are formed in a double-layer structure with an upper layer and a lower layer, the combination of the upper layer and the lower layer may include a Cr/Al-neodymium (Nd) alloy.

A gate insulating layer 130 is formed on the gate line 121 and the storage electrode 123, and a semiconductor layer 140, which may include amorphous silicon, is formed on the gate insulating layer 130 at a position corresponding to the gate electrode 122. The semiconductor layer 140 forms a channel section of the thin film transistor where it overlaps the gate electrode 122. A resistant contact layer (not shown) doped with N-type impurities such as phosphorus (P) and including amorphous silicon may be formed on the semiconductor layer 140. The channel section of the thin film transistor may include polycrystalline silicon in addition to the amorphous silicon.

A data line 151, a source electrode 152, and a drain electrode 154 of the thin film transistor are formed on both the channel section of the thin film transistor and the gate insulating layer 130. The source electrode 152 protrudes from the data line 151, and a portion of the drain electrode 154 overlaps the storage electrode 124 to increase the storage capacitance.

The data line 151, the source electrode 152, and the drain electrode 154 may include a material having superior physical, chemical, and electrical contact characteristics with ITO or IZO, for example, an Mo-based metal or an Mo alloy such as Mo or MoW. The data line 151, the source electrode 152, and the drain electrode 154 may include a first conductive layer that includes an Ag-based metal or an Al-based metal. The data line 151, the source electrode 152, and the drain electrode 154 may have a multi-layer structure that includes the first conductive layer and a second conductive layer that may be made of Cr, Ti, Ta, Mo, and an alloy thereof.

An interlayer dielectric layer 160 is formed on the data line 151, the source electrode 152, and the drain electrode 154, and a contact hole 163 is formed through the interlayer dielectric layer 160 to expose a portion of the drain electrode 154.

A pixel electrode 170 is formed on the interlayer dielectric layer 160 and electrically connected to the drain electrode 154 through the contact hole 163.

An optical gate 20 is formed over the interlayer dielectric layer 160 and the pixel electrode 170 to adjust the reflectance of light. The light reflectance may be achieved by mechanically positioning the optical gate 20 in two or more positions. The optical gate 20 includes a light absorbing section 200, a reflective section 210 formed on the light absorbing section 200, and a color filter 220 formed on the reflective section 210.

The light absorbing section 200 may include a material capable of absorbing light, for example, an organic layer or an opaque electrode. The light absorbing section 200 may be prepared as a single layer that may include Cr or as a multilayer in which a conductive layer that may include a Cr alloy, e.g., chromium oxide ($CrO_x$), is provided together with the chromium layer.

The reflective section 210 and the color filter 220 are located on the light absorbing section 200 to reflect external light. Incident external light reflects from the reflective section 210 and passes through the color filter 220 such that light having a specific color or range of colors may be transmitted to the external environment. The reflective section 210 may include Al, titanium dioxide ($TiO_2$), gold (Ag), or an alloy thereof.

A connection beam 192 disposed on the interlayer dielectric layer 160 horizontally moves the optical gate 20 due to an electrically attractive force or an electrically repulsive force, and a restoring beam 194 disposed on the interlayer dielectric layer 160 returns the optical gate 20 to its original position by an elastic restoring force. In addition, a flexible beam 190 is disposed on the interlayer dielectric layer 160, connects to a first support 180, and is spaced apart from the connection beam 192. The first support 180 contacts the pixel electrode 170. Accordingly, a data voltage signal applied to the pixel electrode 170 is transferred to the flexible beam 190 through the first support 180.

One end of the flexible beam 190 is fixed to the first support 180, and an opposite end of the flexible beam 190 extends from the first support 180 while being bent in the form of a bow and freely movable.

One end of the connection beam 192 is connected to the optical gate 20, and an opposite end of the connection beam 192 is fixed to a second support 184 mounted on the interlayer dielectric layer 160 so that the optical gate 20 may float while being spaced apart from the interlayer dielectric layer 160 at some distance. The second support 184 is electrically connected to a voltage line (not shown) to which a voltage is applied so that the second support 184 receives the voltage.

The restoring beam 194 is provided in the form of a cross so that the restoring beam 194 has elasticity. One end of the restoring beam 194 is connected to the optical gate 20, and an opposite end of the restoring beam 194 contacts a third support 182. The restoring beam 194 horizontally moves the optical gate 20 by elasticity. According to the present exemplary embodiment, although the restoring beam 194 has a cross shape, it is not limited thereto and may have various shapes.

Figure 3:
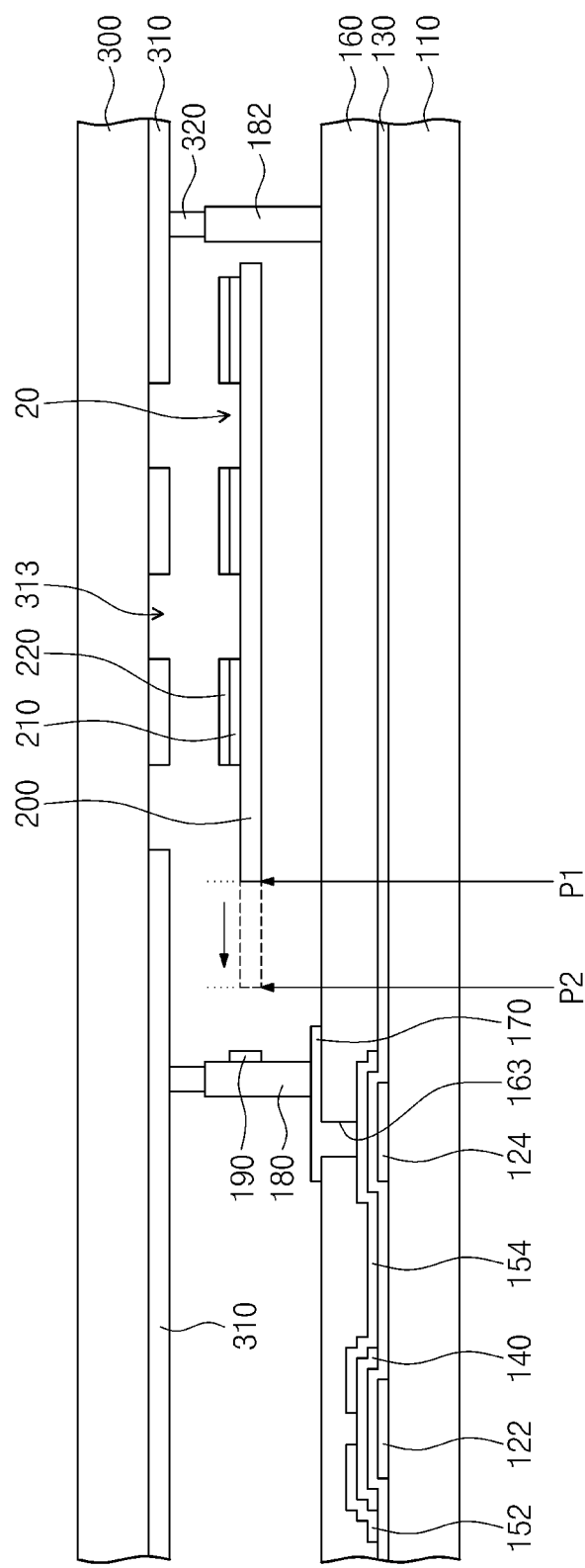
FIG. 3 is a cross-sectional view showing a driving method of the display apparatus according to the first exemplary embodiment of the present invention.

FIG. 3 is a cross-sectional view showing a driving method of the display apparatus according to the first exemplary embodiment of the present invention.

Referring to FIG. 1 and FIG. 3, the opposite end of the flexible beam 190 pushes the connection beam 192 by an electric force established by a voltage difference between the flexible beam 190 and the connection beam 192. The voltage difference arises when the data voltage is transferred to the flexible beam 190 through the first support 180 and a different voltage is transferred to the connection beam 192 through the second support 184, thereby horizontally moving the optical gate 20 connected to the connection beam 192 and the restoring beam 194 from a first position P1 to a second position P2. The restoring beam 194 expands so that the restoring beam 194 has a restoring force. When the voltage difference between the flexible beam 190 and the connection beam 192 is removed, the optical gate 20 moves from the second position P2 to the first position P1 due to the restoring force of the restoring beam 194.

A second substrate 300 is located over the optical gate 20, and a light shielding layer 310 is formed on the second substrate 300. The light shielding layer 310 includes a material to absorb external light and has at least one opening 313 to transmit light. The opening 313 is provided at a position corresponding to the color filter 220 and the reflective section 210 when the optical gate 20 moves to the second position P2. The opening 313 may have the same shape as that of the reflective section 210 and the color filter 220 when viewed in a plan view.

A spacer 320 is formed between the light shielding layer 310 and the optical gate 20 to maintain a distance between the first substrate 110 and the second substrate 300. The spacer 320 may contact at least one of the first support 180, the second support 184, the third support 182, and the light shielding layer 310.

As described above, in the display apparatus according to the present exemplary embodiment, the flexible beam 190 is electrically connected to the thin film transistor, and the connection beam 192 is connected to the optical gate 20 to face the flexible beam 190. Accordingly, the electric force generated between the flexible beam 190 and the connection beam 192 depends on the data voltage applied through the thin film transistor, and the optical gate 20 horizontally moves due to the electric force to adjust the position of the reflective section 210 and the color filter 220.

When the electric force is not generated between the flexible beam 190 and the connection beam 192, the optical gate 20 is located at the first position P1. Accordingly, the reflective section 210 and the color filter 220 of the optical gate 20 do not overlap with the opening 313, and light incident through the opening 313 may be absorbed by the light absorbing section 200, thereby producing a black color. However, when the electric force is generated between the flexible beam 190 and the connection beam 192 as shown in FIG. 3, the electric force causes the optical gate 20 to horizontally move to the second position P2 where the reflective section 210 and the color filter 220 overlap with the opening 313. Accordingly, light incident through the opening 313 is reflected by the reflective section 210 and passes through the color filter 220 so that light matching the color of the color filter 220 may be produced and transmitted to the external environment through the opening 313.

Although the first exemplary embodiment has been described where the optical gate 20 is located at the first position P1 when the electric force is not generated, it is not limited thereto. That is, according to another exemplary embodiment, the optical gate 20 may be located at the second position P2 when the electric force is not generated and may be located at the first position P1 when the electric force is generated. In this case, a black color may be produced when the optical gate 20 is located at the first position P1 when the electric force is generated, and a non-black color may be produced when the optical gate 20 is located at the second position P2 without the electric force.

In addition, the display apparatus according to the present exemplary embodiment may produce color gray scales by adjusting the reflectance of the external light. In order to produce the color gray scales, the degree of overlap of the optical gate 20 and the opening 313 may be adjusted or the overlap time of the optical gate 20 and the opening 313 may be adjusted. For example, the degree of overlap of the optical gate 20 and the opening 313 may be adjusted by adjusting the magnitude of a data signal applied to the data line 151, and the overlap time of the optical gate 20 and the opening 313 may be adjusted by varying the time during which the data signal is applied to the data line 151.

As described above, in the display apparatus according to the present exemplary embodiment, the reflective section 210 and the color filter 220 are formed in the optical gate 20 so that the manufacturing process may be simplified. Additionally, the area of the optical gate 20 may be reduced due to the use of external light so that the aperture ratio of the display apparatus may be improved.

Hereinafter, a method of manufacturing the display apparatus according to an exemplary embodiment of the present invention will be described with reference to accompanying drawings.

FIG. 4A, FIG. 4B, FIG. 4C, FIG. 4D, FIG. 4E, FIG. 4F, FIG. 4G, FIG. 4H, FIG. 4I, FIG. 4J, FIGS. 4K, and 4L are cross-sectional views showing a manufacturing method for the first substrate 110 and the optical gate 210. The method of manufacturing the display apparatus according to the first exemplary embodiment of the present invention will be described with reference to FIG. 1 and FIG. 2. Hereinafter, the same reference numerals will designate the same elements.

Figure 4A:
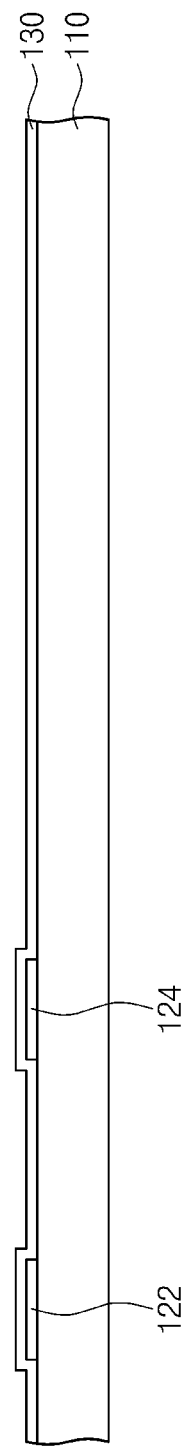

As shown in FIG. 4A, the gate line 121 and the storage electrode line 123 are formed on the first substrate 110. The gate line 121 extends in the horizontal direction and includes the gate electrode 122, and the storage electrode line 123 extends parallel to the gate line 121 and includes the storage electrode 124. The gate line 121 and the storage electrode line 123 may be formed through a photolithographic process performed after a thin film deposition process.

Next, the gate insulating layer 130 is formed on the first substrate 110 to cover the gate line 121 and the storage electrode line 123.

Figure 4B:
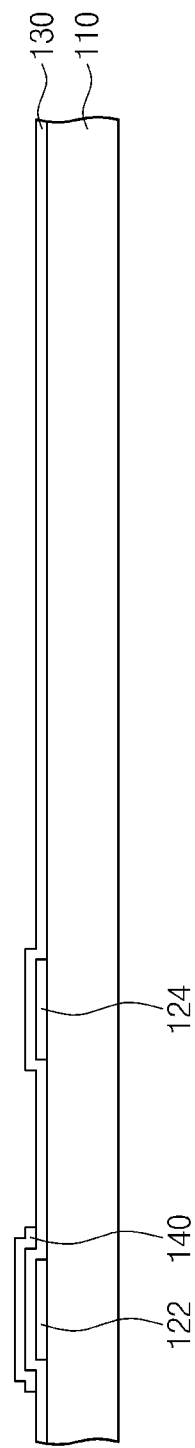

Thereafter, as shown in FIG. 4B, the semiconductor layer 140 is disposed on the gate insulating layer 130 to overlap with the gate electrode 122.

Subsequently, as shown in FIG. 4C, the source electrode 152, the drain electrode 154, and the data line 151 are formed. The data line 151 is arranged substantially perpendicular to the extension direction of the gate line 121 and insulated from the gate line 121 and the storage electrode line 123 by the gate insulating layer 130. The source electrode 152, the drain electrode 154, and the data line 151 may be formed through a photolithographic process after a thin film deposition process.

Then, as shown in FIG. 4D, the interlayer dielectric layer 160 is formed on the source electrode 152, the drain electrode 154, the gate electrode 122, and the gate insulating layer with a contact hole 163 that exposes a portion of the drain electrode 154. The contact hole 163 may be formed through a photolithographic process.

Figure 4E:
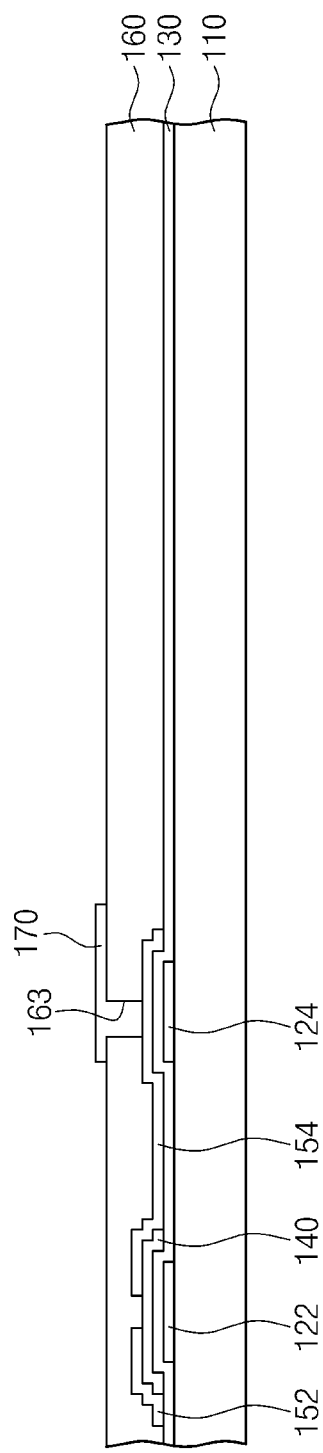

Thereafter, as shown in FIG. 4E, the pixel electrode 170 is formed on the interlayer dielectric layer 160. The pixel electrode 170 contacts the drain electrode 154 through the contact hole 163.

Next, as shown in FIG. 4F, a sacrificial layer 172 is formed on the pixel electrode 170 and the interlayer dielectric layer 160. The sacrificial layer 172 includes first, second, third, and fourth step difference sections I, II, III, and IV that may have different depths. In order to form the step difference sections I, II, III, and IV in the sacrificial layer 172, various processes may be used. For example, a photolithographic process using a slit mask or an imprint scheme that uses a mold pattern having a plurality of step differences may be used. The second step difference section II and the fourth step difference IV may have the same depth as that of the third step difference section III.

As shown in FIG. 4G, the first support 180, the second support 184, and the third support 182 are formed in a region corresponding to the first step difference section I of the sacrificial layer 172.

Subsequently, as shown in FIG. 4H, the flexible beam 190 is formed in a region corresponding to the second step difference section II. The flexible beam 190 may be formed through a photolithographic process after a thin film deposition scheme.

Next, as shown in FIG. 4I, the light absorbing section 200, the connection beam 192 to supply the elastic force that horizontally moves the optical gate 20, and the restoring beam 194 to supply the restoring force that returns the light absorbing section 200 into an original position are formed in the fourth step difference section IV. The light absorbing section 200, the connection beam 192, and the restoring beam 194 may be formed through an electroplating scheme, an electroless plating scheme, or a photolithographic process after a thin film deposition process.

In addition, the flexible beam 190, the light absorbing section 200, the connection beam 192, and the restoring beam 194 may be formed together through a single process.

Then, as shown in FIG. 4J, the reflective section 210 and the color filter 220 are formed on the light absorbing section 200. The reflective section 210 and the color filter 220 may be formed by using the same mask as used in an earlier photolithographic process.

Figure 4K:
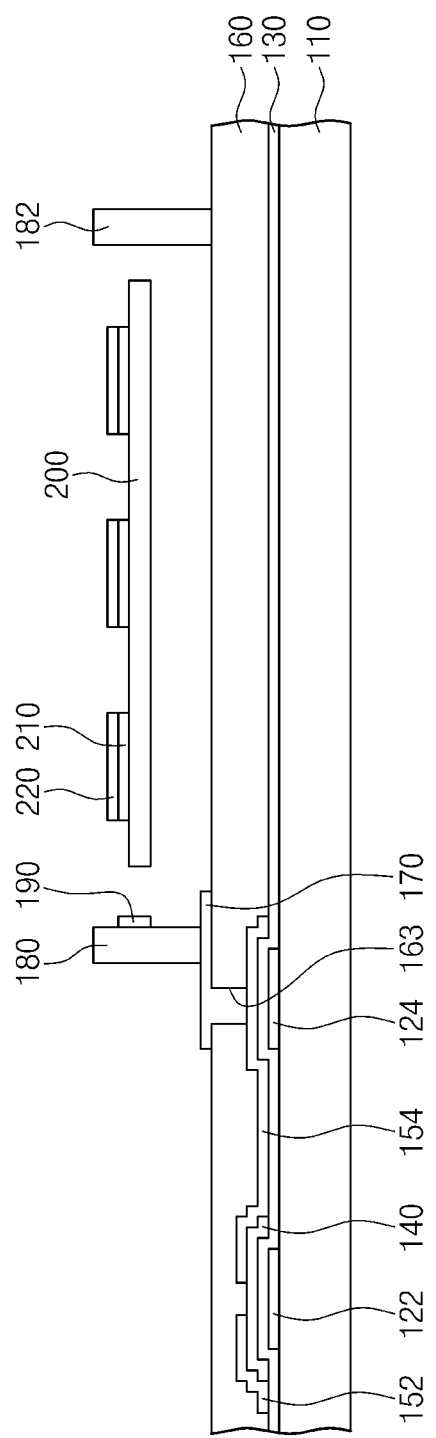

Thereafter, as shown in FIG. 4K, the sacrificial layer 172 is removed through an etching process so that the optical gate 20 that includes the light absorbing section 200, the reflective section 210, and the color filter 220 is spaced apart from the first substrate 110 at some distance.

Although not shown in FIG. 4K but shown in FIG. 2, the light shielding layer 310 is formed on the second substrate 300. The light shielding layer 310 has the opening 313 that may be formed through a photolithographic process. The spacer 320 is formed on the light shielding layer 310 to maintain the distance between the first substrate 110 and the second substrate 300. The spacer 320 and the light shielding layer 310 may be formed together through a photolithographic process using a slit mask.

Figure 4L:
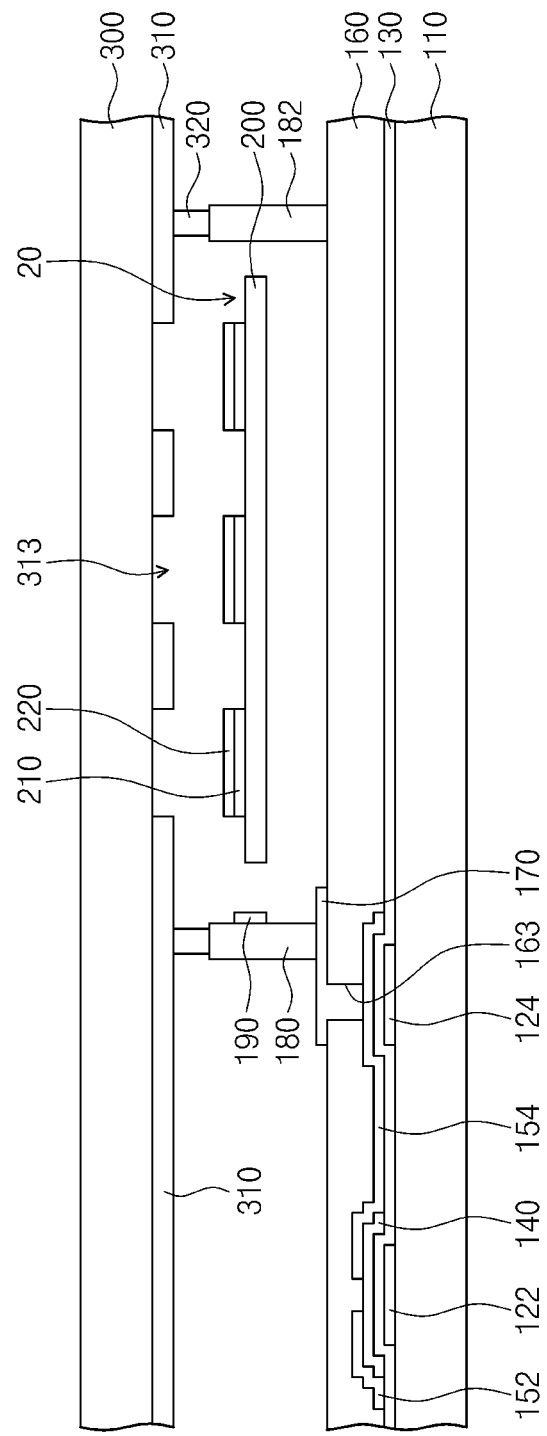

Next, as shown in FIG. 4L, the first substrate 110 is coupled with the second substrate 300. The spacer 320 contacts the first support 180, the second support 184, and the third support 182 so that the distance between the first substrate 110 and the second substrate 300 can be maintained.

Figure 5:
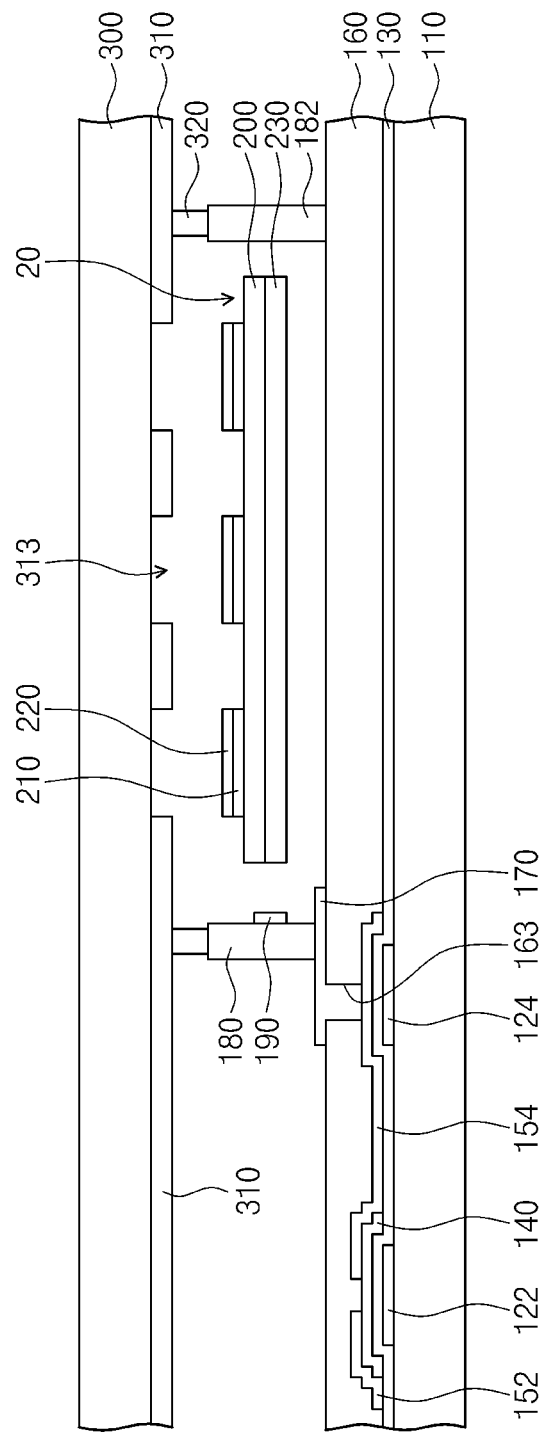
FIG. 5 is a cross-sectional view showing a display apparatus according to a second exemplary embodiment of the present invention.
Figure 6:
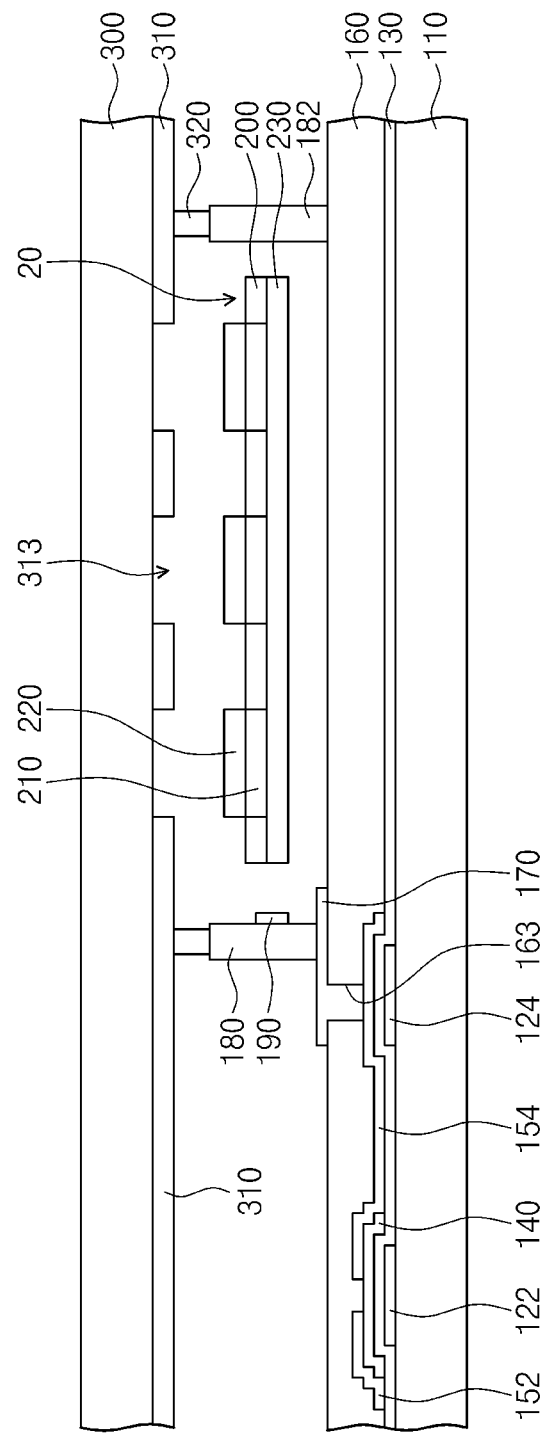
FIG. 6 is a cross-sectional view showing a display apparatus according to a third exemplary embodiment of the present invention.
Figure 7:
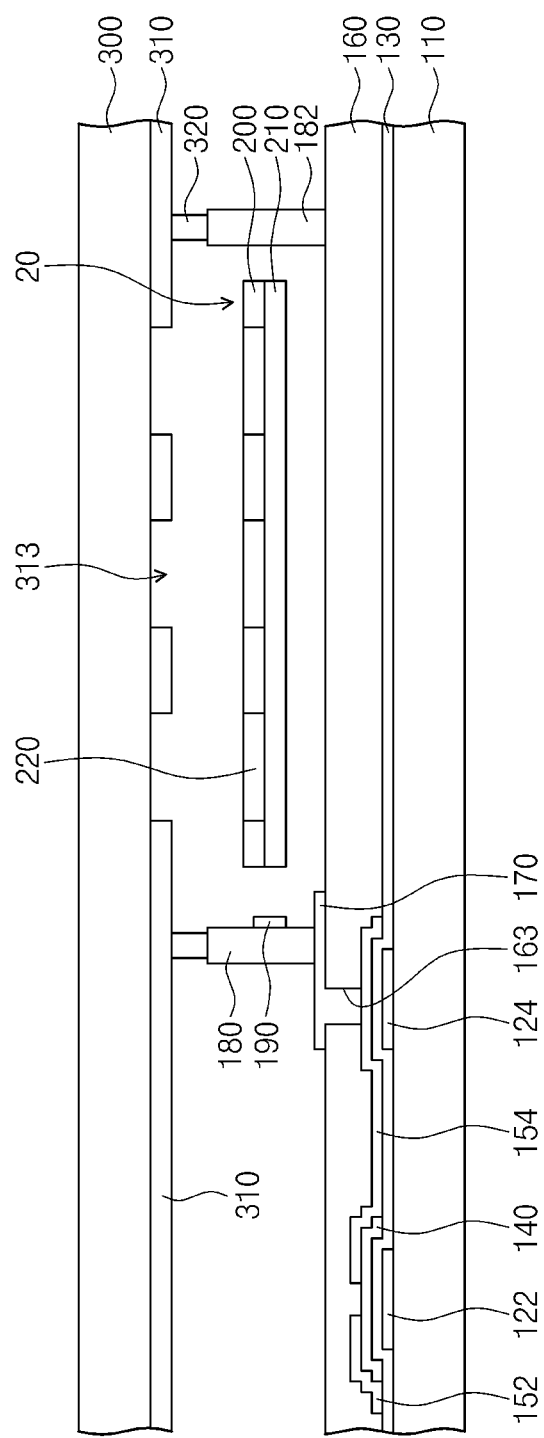
FIG. 7 is a cross-sectional view showing a display apparatus according to a fourth exemplary embodiment of the present invention.

FIG. 5, FIG. 6, and FIG. 7 are cross-sectional views showing various display apparatus according to a second exemplary embodiment, third exemplary embodiment, and a fourth exemplary embodiment of the present invention. Hereinafter, the second, third, and fourth exemplary embodiments will be described while focusing on differences between them and the first exemplary embodiment with reference to FIG. 1, FIG. 2, and FIG. 3 to avoid redundancy, and the same reference numerals designate the same elements.

FIG. 5 is a cross-sectional view showing a display apparatus according to the second exemplary embodiment of the present invention.

As shown in FIG. 5, the display apparatus according to the second exemplary embodiment includes an optical gate substrate 230 disposed below the light absorbing section 200 to support the light absorbing section 200. The optical gate substrate 230 may include an electrode material to reflect light. The optical gate substrate 230 may contain a first conductive layer, which may include a metal such as an Al-based metal. The optical gate substrate 230 may have a multi-layer structure that may include the first conductive layer and a second conductive layer. The second conductive layer may contain materials such as Cr, Ti, Ta, Mo, and an alloy thereof. The optical gate substrate 230 may enhance the strength of the optical gate 20.

FIG. 6 is a cross-sectional view showing a display apparatus according to the third exemplary embodiment of the present invention.

As shown in FIG. 6, the display apparatus according to the third exemplary embodiment includes the light absorbing section 200 formed on the optical gate substrate 230. The light absorbing section 200 may include a plurality of openings (not shown) spaced apart from each other by a distance and that corresponds to the openings 313 of the light shielding layer 310 of the second substrate 300. The reflective section 210 is formed in the opening of the light absorbing section 200, and the color filter 220 is formed on the reflective section 210.

Since the light absorbing section 200 is formed on the same layer as the reflective section 210 in the display apparatus according to the third exemplary embodiment, the thickness of the optical gate 20 may be reduced.

FIG. 7 is a cross-sectional view showing a display apparatus according to the fourth exemplary embodiment of the present invention.

As shown in FIG. 7, in the display apparatus according to the fourth exemplary embodiment, the light absorbing section 200 has a plurality of openings formed on the reflective section 210 that corresponds to the second openings 313 of the light shielding layer 310. The color filter 220 is formed in each opening of the light absorbing section 200. The connection beam 192 and the restoring beam 194 are connected to the reflective section 210.

In the display apparatus according to the fourth exemplary embodiment, the optical gate 20 includes the light absorbing section 200 and the color filter 220 formed on the reflective section 210 without the optical gate substrate 230, thereby simplifying the manufacturing process. The light absorbing section 200 and the color filter 220 are formed on the same layer so the thickness of the optical gate 20 may be reduced.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A microelectromechanical system substrate, comprising:
   a first substrate;
   an optical gate disposed on the first substrate and configured to move to at least two different positions in a direction parallel to an upper surface of the first substrate;
   a thin film transistor disposed on the first substrate;
   a first beam electrically connected to the thin film transistor and disposed on the first substrate;
   a second beam connected to the optical gate and facing the first beam; and
   a light shielding layer facing the optical gate and comprising at least one opening corresponding to a color filter,
   wherein:
   the optical gate comprises the color filter and a light absorbing section;
   the second beam moves the optical gate in response to a voltage difference between the first beam and the second beam;
   the light absorbing section is arranged below the color filter;
   the optical gate is interposed between the first substrate and the light shielding layer;
   the at least one opening overlaps with the color filter at a first position, and overlaps with the light absorbing section at a second position that is different from the first position; and
   at least a portion of the color filter overlaps with the at least one opening when a voltage is applied to the first beam, and the light absorbing section overlaps with the at least one opening when the voltage is not applied to the first beam.

2. The microelectromechanical system substrate of claim 1, wherein the light absorbing section comprises an organic layer or an opaque electrode.

3. The microelectromechanical system substrate of claim 1, wherein the optical gate further comprises an optical gate substrate disposed below the light absorbing section.

4. The microelectromechanical system substrate of claim 3, wherein the light absorbing section comprises an organic layer or an opaque electrode.

5. The microelectromechanical system substrate of claim 3, wherein the optical gate further comprises a reflective section disposed between the light absorbing section and the color filter.

6. The microelectromechanical system substrate of claim 5, wherein the light absorbing section comprises an organic layer or an opaque electrode.

7. The microelectromechanical system substrate of claim 1, wherein the light absorbing section comprises:
   a plurality of second openings; and
   a reflective section,
   wherein at least a portion of the reflective section is disposed in the second openings.

8. The microelectromechanical system substrate of claim 7, wherein the light absorbing section further comprises an organic layer or an opaque electrode.

9. The microelectromechanical system substrate of claim 8, wherein the optical gate further comprises an optical gate substrate disposed below the light absorbing section.

10. The microelectromechanical system substrate of claim 1, wherein the light absorbing section comprises a plurality of second openings, and at least a portion of the color filter is disposed in the second openings.

11. The microelectromechanical system substrate of claim 10, wherein the optical gate further comprises an optical gate substrate disposed below the light absorbing section and the color filter.

12. The microelectromechanical system substrate of claim 11, wherein the optical gate substrate comprises an electrode material to reflect light.

13. The microelectromechanical system substrate of claim 12, wherein the light absorbing section comprises an organic layer or an opaque electrode.

* * * * *